United States Patent [19]
Ames

[11] 4,132,517
[45] Jan. 2, 1979

[54] RECESS FILLING MASTIC APPLICATOR WITH STRAIGHT TORSIONAL SPRING AND MEANS FOR ALTERING EFFECTIVE SPRING LENGTH

[76] Inventor: Robert G. Ames, 2150 Forest View, Hillsborough, Calif. 94010

[21] Appl. No.: 853,179

[22] Filed: Nov. 21, 1977

[51] Int. Cl.[2] .................................... B29C 3/00
[52] U.S. Cl. .................................... 425/87; 401/48
[58] Field of Search .................... 425/87, 458; 401/48

[56] References Cited

U.S. PATENT DOCUMENTS 3,888,611 6/1975 Ames .................................... 425/87

*Primary Examiner*—Robert L. Spicer, Jr.
*Attorney, Agent, or Firm*—William R. Piper

[57] ABSTRACT

A recess filling mastic applicator having a novel tool-steering means and a straight torsional spring adjustable as to its effective length for causing the tool body to have a four point contact with the surface over which the tool body travels. The interior of the tool body receives mastic and a pressure plate is pivotally mounted in the body and a handle is pivotally connected to the plate so that the operator can press on the handle for not only holding the body against the flat surface but for also depressing the plate for forcing mastic from the tool for filling the recesses in the surface as the tool is moved thereover. The tool body steering means connects the handle to the pressure plate so that a twisting force applied to the handle will urge the leading end of the tool body to the right or to the left as desired by the operator and thus alter the direction of movement of the tool body.

4 Claims, 9 Drawing Figures

FIG. 3
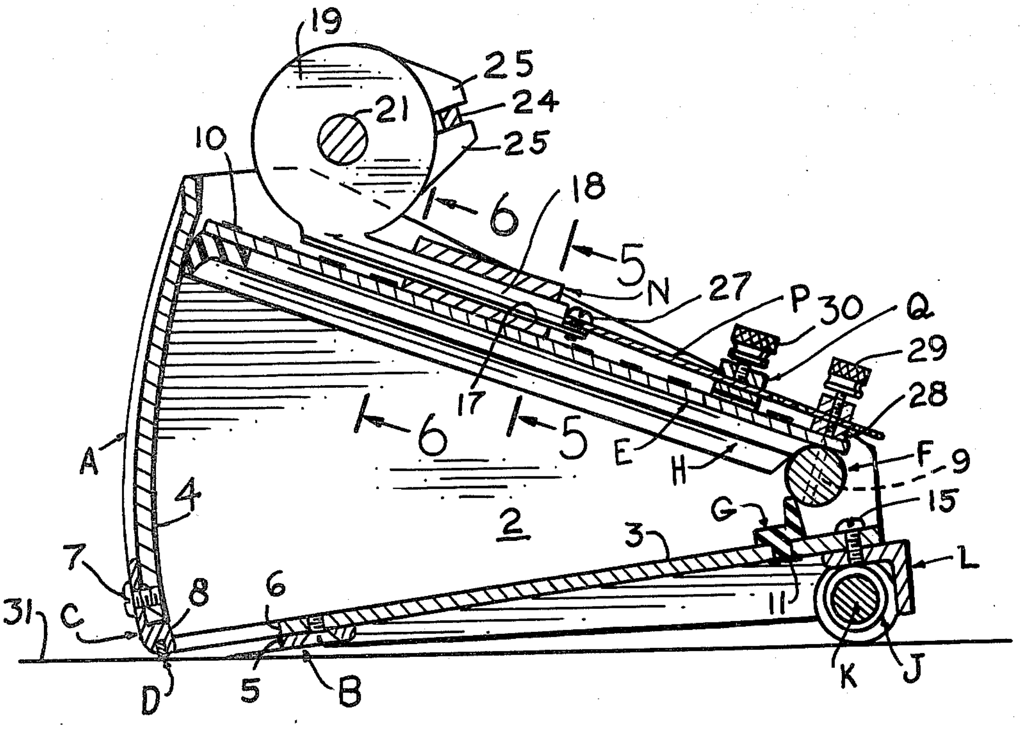
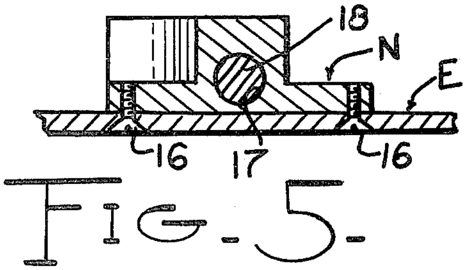
FIG. 5
FIG. 6
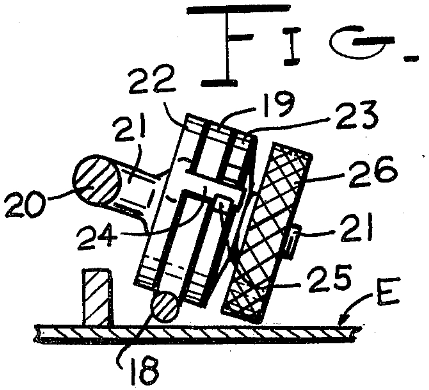
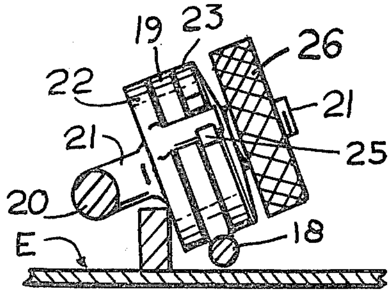
FIG. 7
FIG. 4
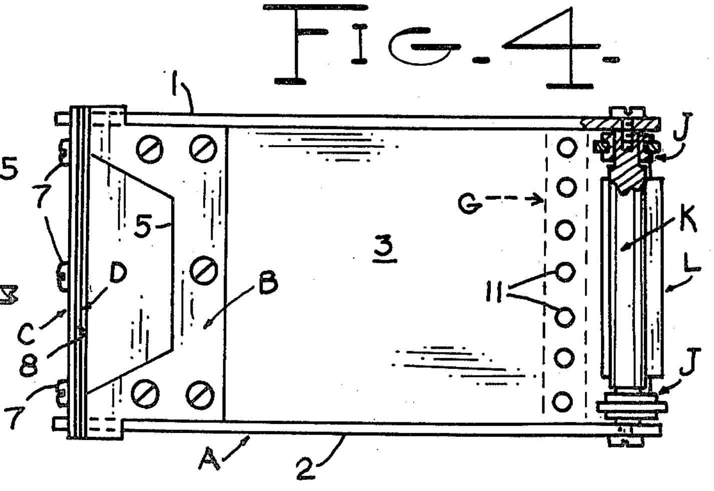

RECESS FILLING MASTIC APPLICATOR WITH STRAIGHT TORSIONAL SPRING AND MEANS FOR ALTERING EFFECTIVE SPRING LENGTH

Cross-Reference to Related U.S. Pat. No. 3,888,611.

My U.S. Pat. No. 3,888,611, issued on June 10, 1975, with a one-half interest assigned to Ulysses Stanley Ames, discloses a recess filling mastic applicator having a four point contact with the surface over which the tool body is moved. The means for connecting the handle to the pivoted pressure plate included an elongated rubber washer positioned under the plate. The handle was pivotally connected to a bracket which in turn had an elongated lower edge rounded in cross section and contacting the upper surface of the pressure plate. The length of this rounded lower bracket edge paralleled the sides of the pressure plate. A plurality of studs extended from the rounded lower bracket edge and passed through enlarged openings in the pressure plate and were received in the elongated washer. Nuts on the exposed ends of the studs tightened the washer against the plate and yet permitted the bracket to swing laterally on its rounded lower edge. The pivoted connection between the handle and the bracket permitted the handle to swing about an axis extending substantially at right angles to the swinging axis of the bracket with respect to the pressure plate.

One difficulty with the elongated washer and the studs extending within the mastic receiving interior of the tool body was that they became contaminated with the mastic and presented a difficult problem to keep clean after the use of the tool. In my improved recess filling mastic applicator I do away with the elongated washer, studs, and nuts. In their place I provide the laterally swingable flat bracket with an elongated integral extension, cylindrical in cross section, whose axis parallels the planes of the tool body's side walls. This extension is rotatably received in a bearing secured to and contacting with the upper surface of the pressure plate. No projections extend within the interior of the tool body and it makes the cleaning of the tool much easier.

A torsional spring is connected to the cylindrical extension of the pressure plate and yieldingly holds the plane of the bracket in a position substantially at right angles to the plane of the pressure plate. This torsional spring can have its effective length altered for changing the force of the spring.

SUMMARY OF THE INVENTION

An object of my invention is to provide a recess filling mastic applicator in which novel means is used for applying a spring biased pressure against the tool body for yieldingly holding its flat undersurface against the wallboard surface over which the tool body is being moved so as to follow any irregularities of this surface. The tool body can swing laterally with respect to the tool handle and a torsional spring connection between the handle and the tool body permits this movement.

In addition, the effective length of the torsional spring may be adjusted and this serves two functions. The first function is the yielding lateral pressure of the tool body on the wall surface can be varied and the second function is that the pivotal connection between the handle and the pressure plate can be shifted toward the front or rear of the plate to alter the cutting pressure of the carbide blade on the mastic extruded from the tool body.

BRIEF DESCRIPTION OF THE DRAWINGS

FIG. 3 is a vertical longitudinal section through the tool body and is taken along the line 3—3 of FIG. 2.

FIG. 4 is a bottom plan view of the tool body on a smaller scale than that shown in FIGS. 1, 2 and 3, portions being shown in section.

FIG. 5 is a transverse section taken along the line 5—5 of FIG. 3.

FIG. 6 is a transverse section taken along the line 6—6 of FIG. 3, and illustrates how the handle and associate parts are rocked in a clockwise direction with respect to the plane of the pressure plate to permit the tool body to swing laterally to follow any irregularities of the flat surface over which the tool body moves.

FIG. 7 is a transverse section similar to FIG. 6, except that the handle and associate parts are shown rocked in a counterclockwise direction with respect to the plane of the pressure plate for the same purpose as set forth in the brief description of FIG. 6.

DESCRIPTION OF THE PREFERRED EMBODIMENT

Figure 1:
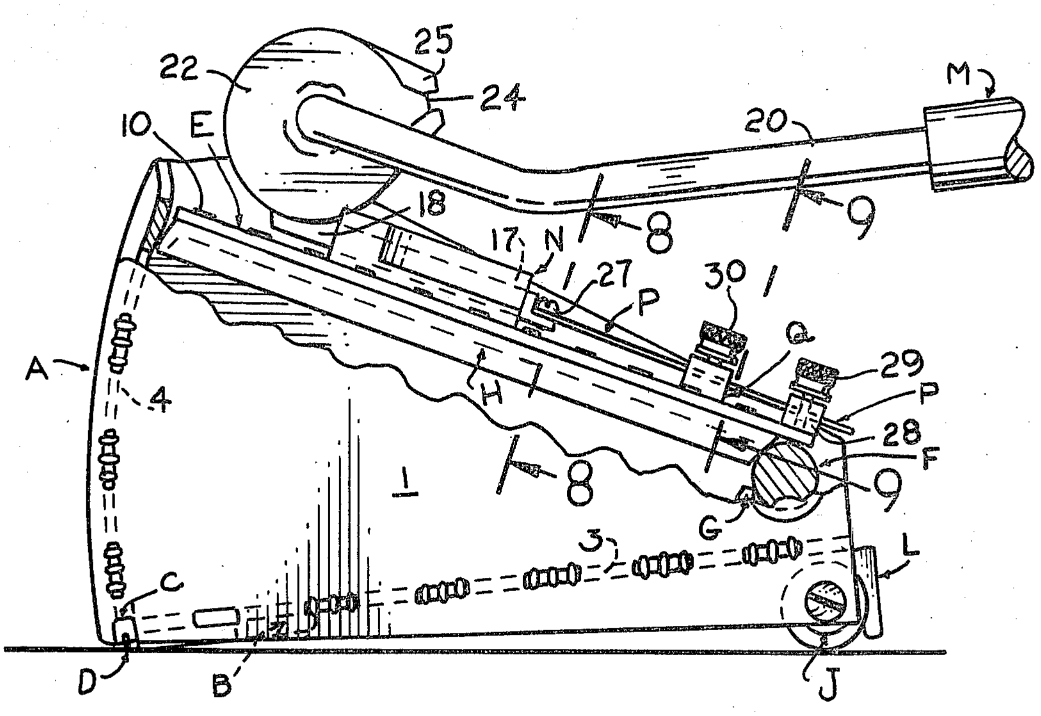
FIG. 1 is a side elevation of the tool with parts broken away and shown in section for purposes of clarity.

In carrying out my invention I provide a tool body A that has side walls 1 and 2, a bottom plate 3, and an arcuate-shaped rear wall 4, see FIGS. 1 to 4 inclusive. A shoe B, of the shape shown in the bottom plan view of FIG. 4, is secured to the underside of the bottom plate 3, and it has an opening 5 that registers with a front opening 6 provided at the front of the bottom plate.

A matrix C, is secured to the lower edge of the arcuate-shaped rear wall 4 by screws 7, see FIG. 3, and it has an elongated groove 8 for receiving a trowelling carbide blade D. The interior of the body A is closed by a swingable pressure plate E. The end of the pressure plate disposed opposite to the end nearest to the arcuate wall 4 is secured to a transversely extending shaft F that is journalled between the two side walls 1 and 2 of the tool body A. Screws 9, see FIG. 2, secure the pressure plate to the shaft. A rubber seal G, is secured to the bottom plate 3 and it is L-shaped in cross section so that its upstanding portion as shown in FIG. 3 will yieldingly contact with the length of the shaft F, and will prevent any mastic in the body A from leaking past the shaft.

Figure 2:
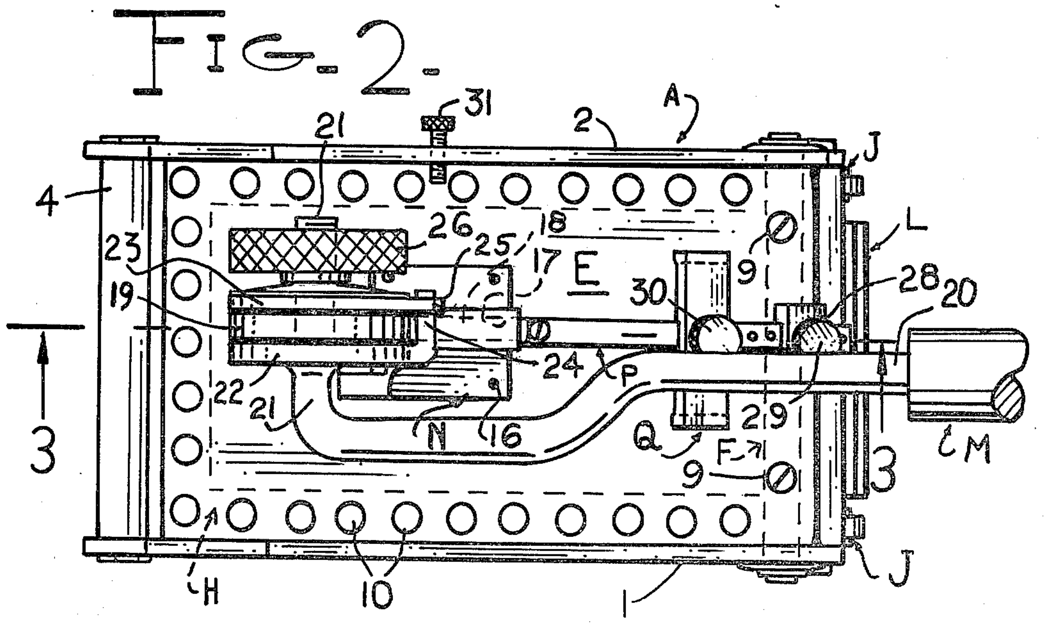
FIG. 2 is a top plan view of FIG. 1.

The pressure plate E has a U-shaped rubber seal H, secured to its under surface, see FIGS. 1, 2 and 3. This seal extends along the two side edges of the pressure plate and along its rear edge. The seal is angle-shaped in cross section and it has integral and spaced apart projections 10 that are received in openings in the plate for securing the seal thereto. In like manner, the rubber seal G, has spaced apart projections 11 received in openings in the bottom plate 3 for the tool body A. The U-shaped rubber seal H yieldingly contacts with the side walls 1 and 2 and with the arcuate-shaped end wall 4 of the tool body A to prevent any leakage of mastic thereby when the pressure plate H, is swung toward the bottom plate 3 of the body A. The two rubber seals G and H, effectively seal the interior of the tool body so that when the pressure plate H is pressed inwardly, mastic will be extruded through the opening 6 in the bottom plate 3 and the opening 5 in the shoe B.

FIG. 3 illustrates the front end of the tool body bottom plate 3 elevated and supported by wheels J. These wheels are rotatably mounted on the reduced end portions of a fixed shaft K, that extends between the side walls 1 and 2 of the tool body A, and is held in place by screws 12, see also FIG. 4. The central portion 13 of the shaft K, lying between its two reduced end portions, presents an annular shoulder at each end thereof which determines the extent of the inward movement of the wheels J while the side walls 1 and 2 limit the outward movement. Therefore, the wheels J have a limited lateral movement that they can make along the reduced end portions of the shaft and the purpose of this will be later described. Each wheel has an annular groove for receiving a ring-shaped rubber tire 14. A guard L for the shaft K, is secured to the underside of the bottom plate 3 of the tool body A, and is secured in place by screws 15. The guard is angular shaped in cross section and extends between and in front of the fixed shaft K.

I will now describe how the tool handle M, is operatively connected to the pressure plate E. In FIGS, 1 to 4, inclusive, I show an elongated bearing N, secured to the top of the pressure plate by screws 16. The bearing has an elongated cylindrical bore 17 for rockably receiving a rod-like appendage 18, that is integral with a disc-shaped member 19, see FIG. 3. The axis of the appendage 18 lies parallel to the plane of the pressure plate and also parallel to the side edges thereof. The appendage extends substantially tangent to the periphery of the disc-shaped member 19.

The handle M has an extension 20 with a bent portion 21, circular in cross section and extending axially through a center opening in the disc-shaped member 19, see FIGS. 2 and 3. A metal washer 22 is welded to the bent portion 21 and abuts one face of the disc-like member 19 and a second metal washer 23 is mounted on that part of the bent portion 21 which extends beyond the member 19 and it abuts the opposite face of the member 19. The two washers 22 and 23 are interlocked by an integral tongue 24 on the periphery of the washer 22 being received in a yoke-like extension 25 on the periphery of the washer 23, see FIGS. 3, 5, and 6. As the handle M and its extension 20 are swung about the axis of the bent portion 21 as a center, the washer 22 will be rotated through an arc about this axis and will rotate the washer 23 therewith.

The two metal washers 22 and 23 may have their frictional binding on the two faces of the disc-like member 19 altered by adjusting a knurled nut 26 on the threaded end of the bent portion 21 connected to the handle M. The nut may be tightened against the adjacent side of the washer 23 and this will force the washer against the face of the member 19 and will draw the face of the other washer 22 against the opposite side of the member 19. The operator can control the degree of friction he wishes to establish between the washers 22 and 23 and the central disc-shaped member 19 by tightening the nut 26 and in this way control the degree of force it requires to swing the handle M, and rotate the washers with respect to the member 19.

It is necessary to permit lateral swinging movement between the tool body A and the handle M, as the operator moves the tool body over a surface in order for the flat underside of the body to follow any irregularities in the surface. I provide novel means for accomplishing this and reference is made to FIGS. 1 to 3 inclusive, where I show a flat torsional spring P, with one end connected by a screw 27 to an integral tongue extending from the free end of the rod-like member 18. The other end of the torsional spring extends through a slot in an anchor block 28 and a screw 29 extends through the anchor block slot and through an opening 29a in the spring P for connecting the spring to the block. The shifting of the torsional spring P, in the anchor block 28 shifts the pivoted end 21 of the tool handle M along the pressure plate E into the proper position for the operator to apply the desired pressure on the carbide blade D, as will be explained later.

The function of the spring P, is to maintain the rod-like member 18 in the position shown in FIGS. 1 to 3 inclusive so as to hold the disc-like member 19 in an upright position where its parallel side walls will extend substantially at right angles to the plane of the pressure plate E. The median line along the torsional spring P, is in alignment with the longitudinal axis of the rod-like member 18 and any lateral swinging of the tool body A with respect to the member 18 and the tool handle M, will be yieldingly resisted by the twisting of the torsional spring about its longitudinal axis.

In addition to the torsional spring P, functioning in the manner just described, I provide a simple means for altering the effective length of the spring and thereby adjusting the force exerted by the spring on the member 18. In FIGS. 1, 2, 3 and 9, I show a slidable torque adjuster Q which has a slot 29 therein for slidable receiving the spring. The slot parallels the plane of the pressure plate E, and the ends of the torque adjuster Q slidably contact the adjacent surface of the pressure plate, see especially FIG. 9. A set screw 30 is carried by the torque adjuster Q and can be tightened against the torsional spring P to secure the torque adjuster from moving.

The shifting of the torsional spring P, in the slot of the anchor block 28 will move the disc 19 over the pressure plate E toward the pivot end of the plate or toward its rear end. This will move the pivotal connection of the tool handle M, represented by the bent portion 21 of the handle extension 20, with the pressure plate E to the desired position on the plate so that when the operator applies pressure on the handle to extrude mastic from the tool body, he will apply the desired pressure on the carbide blade E for causing the latter to cut through the extruded mastic and with minimum effort and form the proper crown effect to the mastic layer applied to the wall board surface. The operator wants to use thick mastic so it will not have a tendency to run when applied to the surface. Also, this will cut down on the shrinkage of the mastic layer due to the evaporation of the water in the mastic. Different operators apply different pressures on the tool body A and the adjustment of the pivotal connection of the handle M to the plate E determines the pressure the operator can apply on the blade E for cutting the mastic with minimum effort.

OPERATION

From the foregoing description of the various parts of the device, the operation thereof will be readily understood. The interior of the tool body A, is filled with mastic through the opening 5 in the shoe B, and through the opening 6 in the bottom plate 3 of the tool body. Then the operator grasps the handle M, and applies the tool body to the surface over which the tool is moved. The operator has previously tightened the nut 25 on the threaded portion of the axle 21 so as to produce the desired friction of the washers 22 and 23 on the central member 19 from which the rod-like member 18 tangentially extends. He also has positioned the torque adjuster Q at the proper position on the torsion spring P, in order to create the proper yielding pressure on the tool body to return it to a neutral or median position between its extremes of lateral swinging motion.

As the operator moves the tool body A over the surface, he presses on the handle M to apply pressure on the pressure plate E for forcing mastic out through the openings 6 and 5 and onto the wall surface 31, see FIG. 3, where the graphite blade D has a slightly concave lower edge to give a crown effect to the mastic layer, not shown, applied to the surface. Also, any recesses or depressions in the surface will be filled with mastic. The tool body A is moved to the right in FIG. 3 when using the device.

Figure 8:
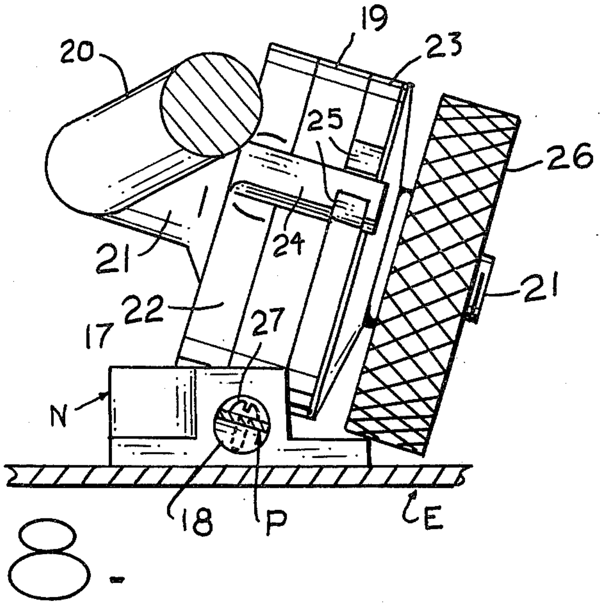
FIG. 8 is an enlarged transverse section taken along the line 8—8 of FIG. 1, and illustrates how the torsional spring is twisted along its longitudinal axis when the handle and associate parts are rocked in a clockwise direction with respect to the plane of the pressure plate in the manner shown in FIG. 6.
Figure 9:
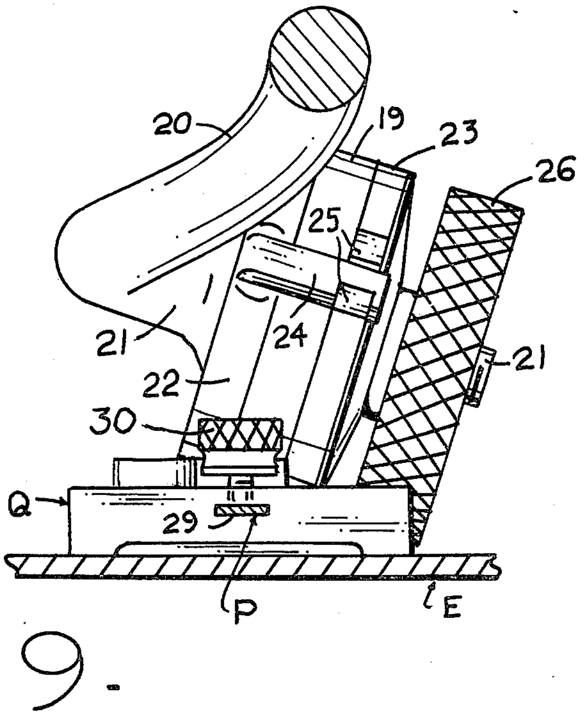
FIG. 9 is an enlarged transverse section taken along the line 9—9 of FIG. 1, and illustrates the slidable and adjustable sleeve contacting the pressure plate and having a slot through which the torsional spring extends, the sleeve being adjustable for altering the effective length of the torsional spring.

FIGS. 6, 8 and 9, show the disc-shaped member 19 swung to the right with respect to the pressure plate E, and the torsional spring P, has been twisted along its longitudinal axis, see FIG. 8, and will yieldingly urge the member 19 back into a position where the flat sides of the member will be at right angles to the flat surface of the pressure plate. In FIG. 7, the member 19 has been swung in the opposite direction from its median position and the torsional spring will be twisted and will yieldingly urge the member 19 back to its normal or median position. A stop screw 31 is mounted in one side wall of the tool body A and limits the swing of the pressure plate E in a clockwise direction about the axis of the shaft F. This will stop the pressure plate from any further swinging in a clockwise direction when the plate nears the open top of the tool body.

The tool body A, in moving over the flat surface 31 will contact this surface at four points. Two of these points are the two ends of the carbide blade D, while the other two points are the wheels J, see FIG. 4. These wheels can shift laterally along the end portions of the shaft K, that are reduced in diameter from that of the main shaft portion. Should the tool body tend to deviate to the right or left from the straight line along which the tool should travel so that the mastic layer will cover the recesses left in the wallboard caused by the finishing nails which secure the wallboard to the supporting members, the operator can bring the tool body back into the proper path. This is accomplished by exerting a lateral thrust on the tool handle M, along its longitudinal axis. A lateral thrust on the handle to the right by the operator will urge the front end of the tool body A, to the right and the wheels J, will slide along the lengths of the reduced diameter ends of the shaft K, and permit this movement until the tool body returns to the proper line of travel. A lateral thrust on the handle to the left will cause the tool body to move to the left if that becomes necessary.

I claim:

1. A recess filling mastic applicator comprising:

(a) a body for receiving mastic and having spaced apart side walls, an arcuate rear wall and a bottom wall having a mastic outlet opening disposed adjacent to the arcuate rear wall;

(b) a mastic pressing plate having its front edge pivotally connected to said side walls, the side edges of said plate being disposed adjacent to the side walls and the rear edge lying adjacent to said arcuate rear wall;

(c) trowelling blade extending transversely across the lower edge of said arcuate trailing wall and having an arcuate concave lower edge so that only the two ends of said blade will contact with the surface over which the tool body is moved;

(d) adjustable means for pivotally connecting a handle to said plate and including means for shifting the pivot point between said handle and said plate toward the front or rear end of the tool and fixing the pivot point so that when pressure is applied on the handle and plate for extruding mastic, the desired amount of pressure can be applied to said blade through the plate pressing on the mastic in the tool body and the mastic pressing on the bottom plate which in turn causes the arcuate end wall to apply the desired pressure on the blade for cutting the extruded mastic and forming a crown effect to the upper surface thereof as the tool body is moved over the surface;

(e) said adjustable means for shifting the pivotal connection between said handle and said pivoted mastic pressing plate including a bearing mounted on the upper surface of said plate and having a bore therein whose axis parallels the planes of the side walls of said tool body;

(f) the pivotal connection between said handle and said mastic pressing plate including a member connected to said handle and having a rod slidably received in the bore of said bearing; and (g) means for moving said rod longitudinally within said bearing for shifting the member along said plate and securing said rod in adjusted position for holding the member in its adjusted position and thereby determining the position of the point of pivotal connection on said plate between the handle and said plate.

2. The combination as set forth in claim 1: and in which (a) said means for moving said rod longitudinally within said bearing for shifting the pivot point between said handle and said plate to the desired position on the plate, including a torsional elongated metal spring with one end rigidly connected to the free end of said rod, the longitudinal axis of said spring being in alignment with said rod axis; and (b) means for adjustably anchoring the free end of said spring to said plate so that the spring may be adjusted lengthwise in said anchoring means for moving the pivot between said handle and said plate to the desired position on the plate after which said anchoring means locks said spring in position.

3. The combination as set forth in claim 2: and in which (a) said torsional spring is rigidly connected to said rod in such a manner as to yieldingly prevent said rod from rotating on its axis either clockwise or counterclockwise, this being caused by said handle being swung laterally with respect to said plate either to the right or to the left; and (b) whereby said rod will be rotated about its axis and twist said torsional spring to place it under tension so that the latter will endevaor to return to normal position and swing said handle to neutral position.

4. A recess filling mastic applicator comprising:

(a) a body having a hollow interior for receiving mastic and having a bottom with an outlet opening therein through which the mastic may be extruded;

(b) a pressure plate having one end pivotally mounted in said body;

(c) a handle;

(d) means pivotally connecting one end of said handle to said plate to permit the swinging of said handle fore and aft with respect to said body, said handle when pressed against said plate forcing the latter against the mastic for extruding it from the outlet opening;

(e) said means permitting the lateral swinging of the body and pressure plate with respect to said handle and including a bearing mounted on the upper surface of said plate and having a bore therein, said means further including a member connected to said handle and having a rod rotatably received in the bore of said bearing;

(f) a torsional elongated flat metal spring having one end rigidly connected to the free end of said rod, the longitudinal axis of said spring being in alignment with the axis of said rod;

(g) means for anchoring the other end of said spring to said plate; and (h) torque adjuster having a body with a flat slot whose plane parallels the plane of said plate, said slot slidably receiving said spring and being mounted between the ends of said spring, said torque adjuster body slidably contacting with the adjacent surface of said pressure plate to hold the plane of the slot in the torque adjuster body parallel with the plane of the pressure plate regardless of the position of the torque body along said torsional spring, the spring being connected to said rod in such a manner as to yieldingly permit said rod to rotate on its axis either clockwise or counterclockwise, this being caused by the mastic holding body, when being moved over a flat surface by the handle, swinging laterally with respect to the handle to follow any irregularities in the flat wall surface.

* * * * *